(12) United States Patent
Yovin

(10) Patent No.: US 9,565,156 B2
(45) Date of Patent: Feb. 7, 2017

(54) REMOTE ACCESS TO A MOBILE COMMUNICATION DEVICE OVER A WIRELESS LOCAL AREA NETWORK (WLAN)

(75) Inventor: John Yovin, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 712 days.

(21) Appl. No.: 13/235,764

(22) Filed: Sep. 19, 2011

(65) Prior Publication Data

US 2013/0070740 A1  Mar. 21, 2013

(51) Int. Cl.
| | |
|---|---|
| H04W 4/00 | (2009.01) |
| H04L 12/58 | (2006.01) |
| H04W 4/16 | (2009.01) |
| H04M 3/42 | (2006.01) |
| H04M 7/12 | (2006.01) |
| H04L 29/08 | (2006.01) |
| H04M 1/725 | (2006.01) |

(Continued)

(52) U.S. Cl.
CPC ............ H04L 51/38 (2013.01); H04L 51/04 (2013.01); H04L 67/125 (2013.01); H04M 1/7253 (2013.01); H04M 1/72519 (2013.01); H04M 3/42263 (2013.01); H04M 7/1285 (2013.01); H04W 4/16 (2013.01); H04M 3/54 (2013.01); H04M 2203/1091 (2013.01); H04M 2250/06 (2013.01); H04W 4/12 (2013.01)

(58) Field of Classification Search
None
See application file for complete search history.

(56) References Cited

U.S. PATENT DOCUMENTS 6,091,948 A * 7/2000 Carr ............... H04M 1/006
                                          455/414.1
6,980,837 B2   12/2005 Chung
(Continued)

FOREIGN PATENT DOCUMENTS

CN     1205822 A    1/1999
CN     1214170 A    4/1999
(Continued)

OTHER PUBLICATIONS

"International Search Report", Mailing Date: Mar. 4, 2013, Application No. PCT/US2012/054924, Filed Date: Sep. 12, 2012, 10 Pages total.

(Continued)

*Primary Examiner* — Michael J Moore, Jr.
(74) *Attorney, Agent, or Firm* — Qudus Olaniran; Judy Yee; Micky Minhas

(57) ABSTRACT

A method and arrangement is provided which allows a PC or other client device to be used to communicate with third parties through a mobile communication device when a user and the mobile communication device are not in the vicinity of one another. The arrangement allows the user to control operation of the mobile communication device over a WLAN so that the user can send or receive messages such as voice and text messages to a remote party from the client device through the mobile communication device over the WLAN and the mobile communication network employed by the mobile device.

17 Claims, 4 Drawing Sheets

(51) Int. Cl.
*H04W 4/12* (2009.01)
*H04M 3/54* (2006.01)

(56) References Cited

U.S. PATENT DOCUMENTS

| | | | |
|---|---|---|---|
| 7,415,293 B1* | 8/2008 | Lee | H04W 52/027 455/574 |
| 7,526,316 B2 | 4/2009 | Shimizu | |
| 7,743,012 B2* | 6/2010 | Chambers et al. | 709/203 |
| 7,822,188 B1 | 10/2010 | Kirchhoff et al. | |
| 8,495,686 B2* | 7/2013 | Maddali et al. | 725/81 |
| 2003/0092451 A1 | 5/2003 | Holloway et al. | |
| 2004/0236840 A1* | 11/2004 | Sarkar | 709/208 |
| 2005/0009574 A1 | 1/2005 | Lin | |
| 2005/0054386 A1 | 3/2005 | Chung | |
| 2006/0046752 A1 | 3/2006 | Kalavade | |
| 2006/0094477 A1* | 5/2006 | Rivera-Cintron | H04B 1/1615 455/574 |
| 2006/0116139 A1 | 6/2006 | Appelman | |
| 2007/0060054 A1 | 3/2007 | Romesburg | |
| 2007/0254631 A1* | 11/2007 | Spooner | 455/411 |
| 2008/0195879 A1* | 8/2008 | Asmi | G06F 1/3203 713/323 |
| 2008/0300920 A1* | 12/2008 | Brown | G06Q 50/22 705/2 |
| 2009/0086953 A1 | 4/2009 | Vendrow | |
| 2009/0238147 A1 | 9/2009 | Bicker et al. | |
| 2009/0276475 A1* | 11/2009 | Ramsey et al. | 707/204 |
| 2010/0112988 A1 | 5/2010 | Tamura | |
| 2010/0279673 A1 | 11/2010 | Sharp et al. | |
| 2011/0188496 A1* | 8/2011 | Schaade | H04L 12/12 370/352 |
| 2012/0254762 A1* | 10/2012 | Parmar et al. | 715/736 |

FOREIGN PATENT DOCUMENTS

| | | |
|---|---|---|
| CN | 1592456 A | 3/2005 |
| CN | 1689252 A | 10/2005 |
| CN | 101163173 A | 4/2008 |
| CN | 101819416 A | 9/2010 |
| CN | 102131305 A | 7/2011 |
| EP | 1954076 A1 | 8/2008 |
| EP | 1991021 A1 | 11/2008 |
| JP | 2003283693 A | 10/2003 |
| JP | 2005080112 A | 3/2005 |

OTHER PUBLICATIONS

"Control mobile phone from PC—Pocket Controller Pro", Retrieved at <<http://hulan.info/item/control-mobile-phone-from-pc-pocket-controller-pro>>, Jul. 18, 2007, pp. 5.
"MOBILedit! 1.90", Retrieved at <<http://www.gold-software.com/download7753.html>>, Retrieved Date: Apr. 1, 2011, pp. 2.
"Remotely Control Your Phone from Computer", Retrieved at <<http://www.technize.com/remotely-control-your-phone-from-computer/>>, Retrieved Date: Apr. 1, 2011, pp. 6.
"MobileController Professional Edition 1.6", Retrieved at <<http://www.freedownloadscenter.com/Information_Management/Personal_Information_Managers/MobileController_Professional_Edition.html>>, Pocket devlop Birisi Inc, Apr. 3, 2009, pp. 3.
Debjit, "Control your Windows Mobile phone from a personal computer using MyMobileR", Retrieved at <<http://digitizor.com/2009/08/18/control-your-windows-mobile-phone-from-a-personal-computer-using-mymobiler/>>, Aug. 18, 2009, pp. 7.
"Office Action Received for European Patent Application No. 12834451.2", Mailed Date: Aug. 22, 2014, 9 Pages total.
"Search Report Received for European Patent Application No. 12834451.2", Mailed Date: Aug. 14, 2014, 3 Pages total.
"Office Action Issued in European Patent Application No. 12834451.2", Mailed Date: Mar. 30, 2015, 8 Pages.
"First Office Action and Search Report Issued in Chinese Patent Application No. 201210347707.0", Mailed Date: Sep. 17, 2014, 13 Pages.
"Second Office Action and Search Report Received for China Patent Application No. 201210347707.0", Mailed Date: May 11, 2015, 13 Pages total.
"Office Action Issued in European Application No. 12834451.2", Mailed Date: Nov. 2, 2015, (8 Pages total).
"Third Office Action Issued in Chinese Patent Application No. 201210347707.0", Mailed Date: Nov. 27, 2015, (16 Pages total).
"Office Action Issued in European Patent Application No. 12834451.2", Mailed Date: Aug. 11, 2016, (10 Pages total).

* cited by examiner

REMOTE ACCESS TO A MOBILE COMMUNICATION DEVICE OVER A WIRELESS LOCAL AREA NETWORK (WLAN)

BACKGROUND

Mobile devices have been adapted to a wide variety of applications, including computing, communication, and entertainment. For example, mobile telephones permit users to freely initiate and receive voice communications. Similarly, mobile media devices have been developed to permit users to take electronic entertainment, including audio, video, and electronic games, to even the most remote location. Further, mobile computing devices have been developed to provide users with remote access to data communications through wireless connectivity, such as over IEEE 802.11 or 3G networks. Some mobile devices, such as smart phones, support a combination of voice communications, entertainment, and mobile computing.

Systems have been developed which allow users of mobile devices to remotely control their mobile devices from a computer or other device. These systems allow access to various applications residing on the mobile device so that the user can, for example, turn on and off various features and functions of the mobile device, navigate through menus available on the device, and so on.

SUMMARY

In one implementation, an arrangement is provided which allows a mobile device to be used to communicate with third parties when the user and the mobile device are not in the vicinity of one another. For instance, if a user is located in one room of a residence and the mobile device is located in another, the user will not be able to place or receive a call or text message using the mobile device. Among other things, the arrangement allows a PC or other client device to place and receive calls and messages through a mobile device without using the mobile device's speaker and microphone. The client device and the mobile device communicate with one another over a local area network such as a Wi-Fi network, for example.

In one particular implementation, a user interface associated with a remote access application allows a user to determine how the mobile device is to respond when a call or message is received or sent. For instance, the user interface allow the user to specify the circumstances under which a call or message should be forwarded to one or more client devices. Such circumstances may include only forwarding calls or messages which are received from predetermined parties who have been specified by the user. In this case the remote access application may interact with a contacts application residing on the mobile communication device so that, for instance, only calls or messages received from someone included in the contacts application will be forwarded on to the client device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Currently, a mobile device can operate in a hands-free mode using Bluetooth or another short-range protocol in which the mobile device is wirelessly paired to an external speaker and microphone. In this way a user can communicate with third parties through the external speaker and microphone while the user is in the vicinity of the mobile device (e.g., when the mobile device and user are both in a car or in the same room). In addition, some mobile devices can be remotely controlled from a PC or other device. Neither of these arrangements allows the mobile device to be used to communicate with third parties when the user and the mobile device are not in the vicinity of one another. For instance, if a user is located in one room of a residence and the mobile device is located in another, the user will not be able to place or receive a call or text message using the mobile device.

As detailed below, an arrangement is provided which allows a PC or other client device to place and receive calls and messages through a mobile device without using the mobile device's speaker and microphone. The client device and the mobile device communicate with one another over a local area network such as a Wi-Fi network, for example. The client device is configured to serve as a controller and end point for all or some of the phone specific operations of the mobile device. That is, the client device is used to control specific features and functions of the mobile device and is not being used to simply capture and replicate the display of the mobile device. Examples of such functions that may be performed on a PC or other client device include displaying and answering incoming calls and receiving and sending text messages. In this case the mobile device is used to establish the phone call connection, but audio, as well as control of the mobile device, is routed to the PC over the local area network. In this way the mobile device can be used to communicate over a mobile network even when the user is not in the immediate vicinity of the mobile device.

Among other advantages, this arrangement allows the user to operate the mobile device with the generally more user-friendly interface of a PC and it also avoids the need to switch between devices when performing a given task. Accordingly, the full keyboard of the PC can be used to compose and send text messages such as SMS messages, a headset connected to the PC can be used to answer calls, and files locally accessible to the PC can be attached to a multimedia messaging service (MMS) message. Additionally, this arrangement allows the mobile device to be used while its display screen is turned off, thereby conserving power and extending the battery life of the device.

Figure 1:
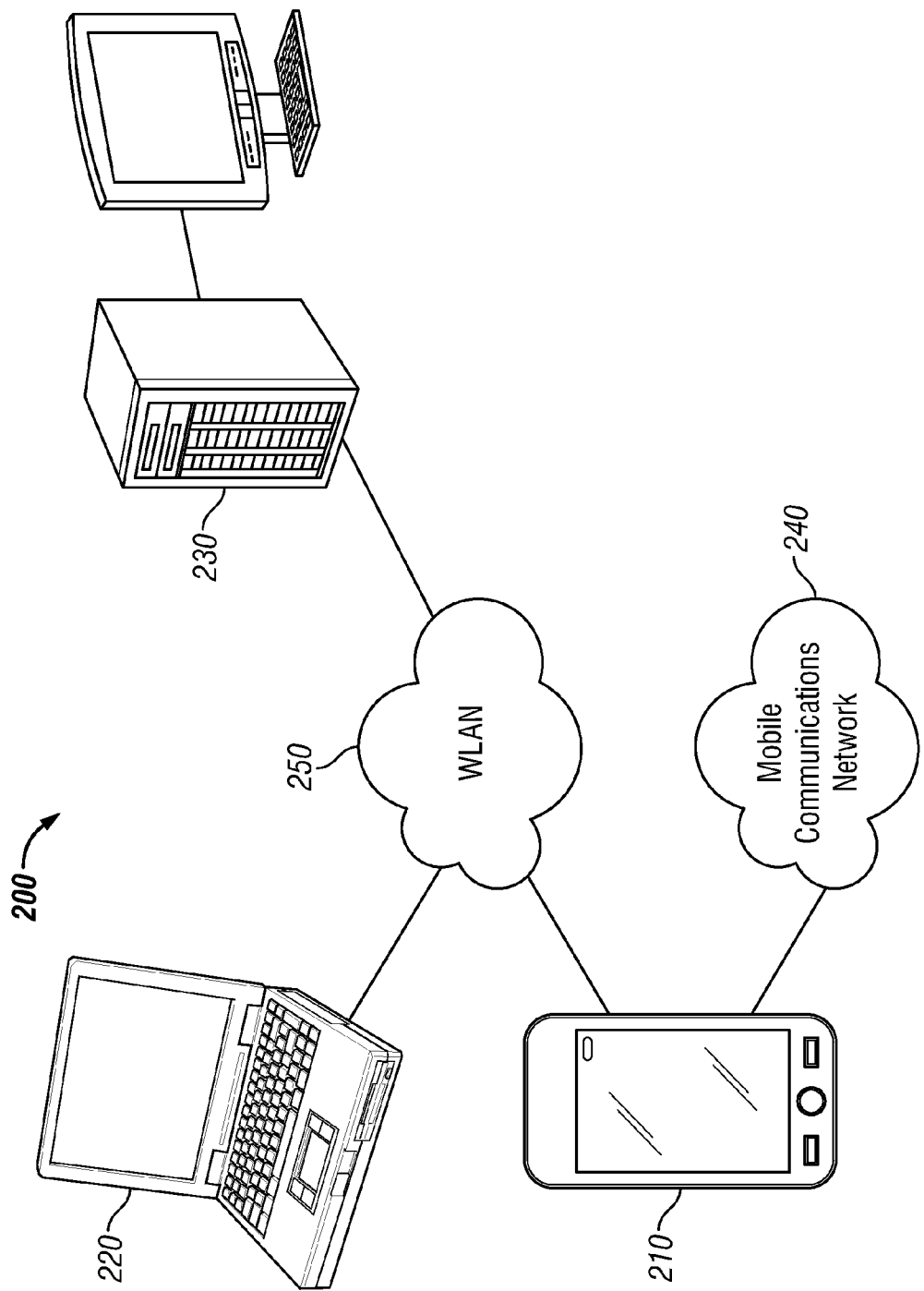
FIG. 1 shows an exemplary computing environment that includes a mobile communication device and client devices.

FIG. 1 shows an exemplary computing environment 200 that includes a mobile device 210 and client devices 220 and 230. A wireless local area network (WLAN) 250 connects the devices so that they can communicate with one another. The WLAN 250 can operate in accordance with any suitable protocol, including, but not limited to, the IEEE 802.11 family of standards. The mobile device 210 can also communicate with third parties over a wide-area mobile network 240 such as a mobile phone network or a mobile data network. Mobile network 240 may operate in accordance with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols.

Client devices 220 and 230 may be any devices that can communicate over WLAN 250. For example, client devices 220 and 230 may be, without limitation, a PC, laptop, netbook, tablet, television, gaming device, landline or wireless telephone, smart phone, media device or a dedicated appliance.

Mobile device 210 is a mobile communications device such as a wireless telephone that in some cases may also contain other functions, such as PDA and/or music player functions. To that end the device may support any of a variety of applications, such as a telephone application, a video conferencing application, an e-mail application, an instant messaging application, a blogging application, a digital camera application, a digital video camera application, a web browsing application, a digital music player application, and/or a digital video player application. In some implementations the mobile device 210 may correspond to a mobile device of the type that will be described below in connection with FIG. 2.

Figure 2:
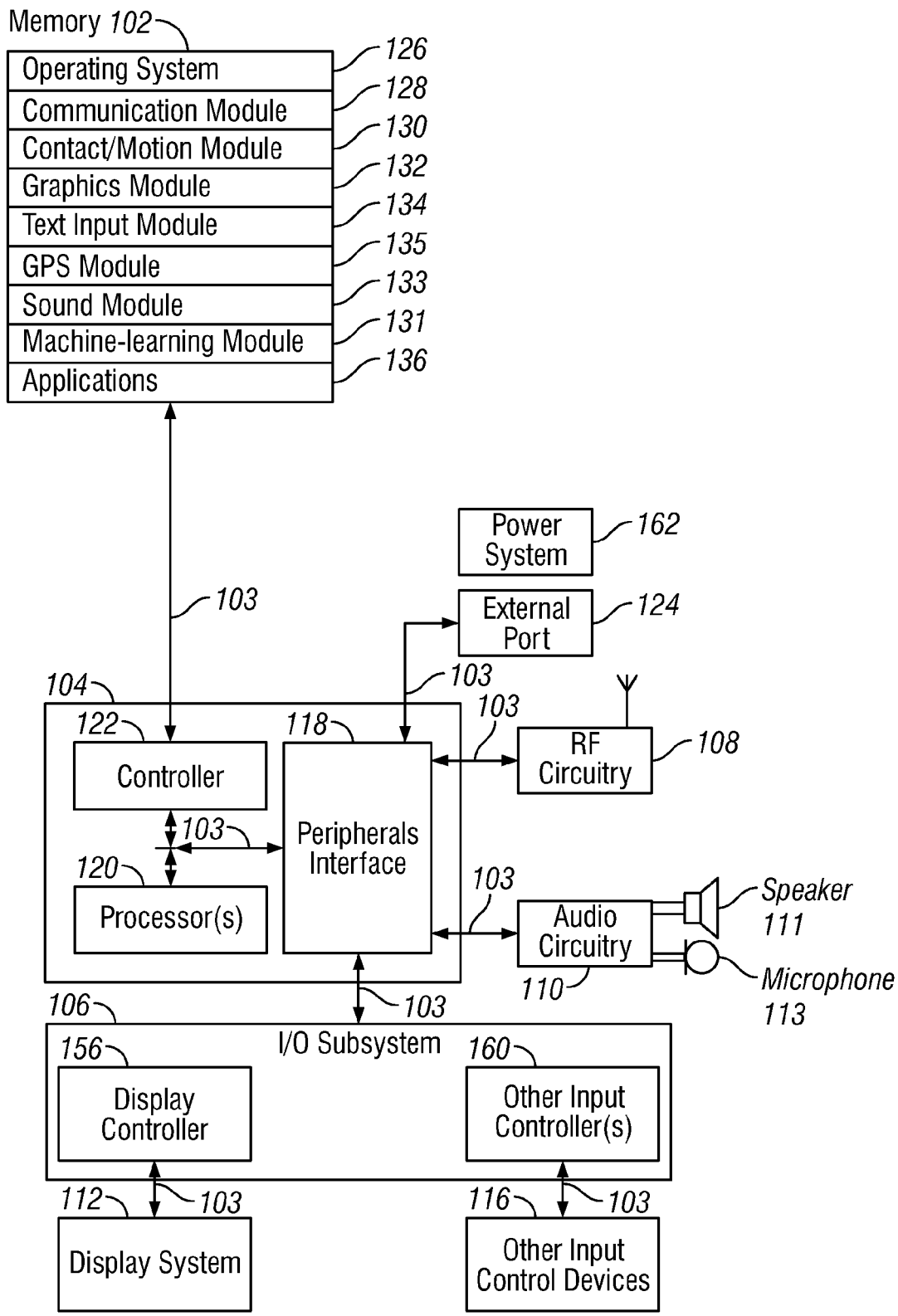
FIG. 2 shows one example of a mobile device.

The mobile device 100 in FIG. 2 includes a memory unit 102 (which may include one or more computer readable storage media), a memory controller 122, one or more processors (CPU's) 120, a peripherals interface 118, RF circuitry 108, audio circuitry 110, a speaker 111, a microphone 113, display system 103, an input/output (I/O) subsystem 106, other input or control devices 116, and an external port 124. These components may communicate over one or more communication buses or signal lines 103. Along with the input or control devices 116, the speaker 111, microphone 113 and display system 103 form a user interface through which a user can enter and receive various types of information and can communicate with other individuals over communication networks using RF circuitry 108.

It should be appreciated that the device 100 is only one example of a mobile communications device 100 and that the device 100 may have more or fewer components than shown, may combine two or more components, or a may have a different configuration or arrangement of components. The various components shown in FIG. 2 may be implemented in hardware, software or a combination of both hardware and software, including one or more signal processing and/or application specific integrated circuits.

Memory unit 102 may include high-speed random access memory and non-volatile memory, such as one or more magnetic disk storage devices, flash memory devices, or other non-volatile solid-state memory devices. Access to memory unit 102 by other components of the device 100, such as the CPU 120 and the peripherals interface 118, may be controlled by the memory controller 122. The peripherals interface 118 couples the input and output peripherals of the device to the CPU 120 and memory unit 102. The one or more processors 120 run or execute various software programs and/or sets of instructions stored in memory unit 102 to perform various functions for the device 100 and to process data. In some examples the peripherals interface 118, the CPU 120, and the memory controller 122 may be implemented on a single chip, such as a chip 104. In other examples they may be implemented on separate chips.

The RF (radio frequency) circuitry 108 includes one or more receivers and transmitters (e.g., a transceivers) for respectively receiving and sending RF signals, also called electromagnetic signals over both the WLAN 250 and the mobile communication network 240. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 communicates with mobile communications networks and WLANs such as shown in FIG. 1.

The audio circuitry 110, the speaker 111, and the microphone 113 form a part of the user interface provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from audible signals (i.e., sound waves). The speaker 111 and microphone 113 are two examples of audio transducers that may be employed in the mobile communications device. The audio circuitry 110 converts the electrical signal to audio data and transmits the audio data to the peripherals interface 118 for processing. Audio data may be retrieved from and/or transmitted to memory unit 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the display screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some examples input controller(s) 160 may be coupled to any (or none) of the following: a keyboard, infrared port, USB port, and a pointer device such as a mouse.

The display screen 112 provides an input interface and an output interface between the device and a user. The display controller 156 receives and/or sends electrical signals from/to the display screen 112. The display screen 112 displays visual output to the user. The visual output may include graphics, text, icons, video, and any combination thereof (collectively termed "graphics").

The display screen 112 will generally include a suitable display such as an OLED display, PLED display, active matrix liquid crystal display, passive matrix liquid crystal display, electrophoretic display, cholesteric liquid crystal display, polymer dispersed liquid crystal and nematic liquid crystal display. In some implementations the display screen 112 may be a touch-screen display.

The device 100 also includes a power system 162 for powering the various components. The power system 162 may include a portable power supply (e.g., battery) and components necessary to receive power from an alternating current (AC) source, a power management system, a recharging system, a power failure detection circuit, a power converter or inverter and any other components associated with the generation, management and distribution of power in portable devices.

In some embodiments, the software components stored in memory unit 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, a sound module 133 (or set of instructions) and applications (or set of instructions) 136.

The operating system 126 (e.g., Darwin, RTXC, LINUX, UNIX, OS X, Microsoft WINDOWS®, Android or an embedded operating system such as VxWorks) includes various software components and/or drivers for controlling and managing general system tasks (e.g., memory management, storage device control, power management, etc.) and facilitates communication between various hardware and software components. The communication module 128 facilitates communication with other devices over one or more external ports 124 and also includes various software components for handling data received by the RF circuitry 108 and/or the external port 124 (e.g., Universal Serial Bus (USB), FIREWIRE, etc.).

The graphics module 132 includes various known software components for rendering and displaying graphics on the display screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., applications that provide location-based services such as weather widgets, local yellow page widgets, and map/navigation widgets).

The applications 136 may include any combination of the following illustrative modules: a contacts module, a telephone module; a video conferencing module; an e-mail client module an instant messaging (IM) module; a blogging module; a camera module; an image management module; a video player module; a music player module; a browser module; a word processing module; a voice recognition module; a calendar module; widget modules, which may include a weather widget, stocks widget, calculator widget, alarm clock widget, dictionary widget, and other widgets obtained by the user, as well as user-created widgets.

In one implementation, applications 136 may include a remote access application that allows a user of a client device who is not necessarily in the vicinity of a mobile device to place and receive calls and messages through the mobile device without using the mobile device's speaker and microphone. Other functions and features offered by the status application will be discussed below.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory unit 102 may store a subset of the modules and data structures identified above. Furthermore, memory unit 102 may store additional modules and data structures not described above. For instance, in the illustrative environment of FIG. 1, client devices 220 or 230 may be used to place and receive calls and messages on mobile device 210 using the WLAN 250 to establish communication between the two devices. In one particular implementation, this functionality is implemented on the mobile device side by an application such as the aforementioned remote access application.

Figure 3:
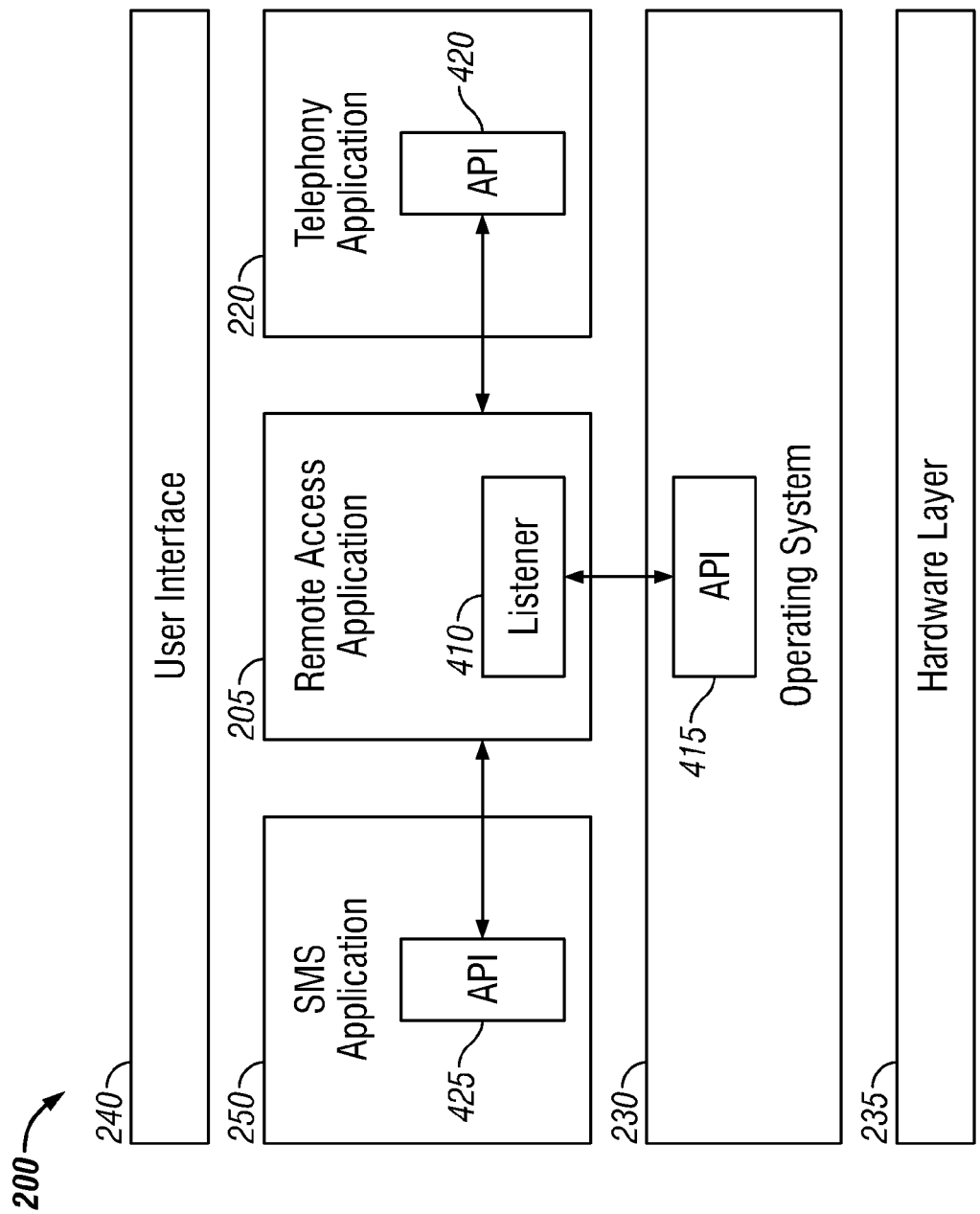
FIG. 3 shows an illustrative logical architecture of the major functional components of a mobile communication device platform.

FIG. 3 shows an illustrative logical architecture 200 of the major functional components of a mobile device platform, which will be used to show certain high level features of one particular implementation of a remote access application as described herein. In this exemplary embodiment, the remote access application 205 executes on the mobile device 210 along with a voice call or telephony application 220 and an SMS application 250 and other applications as collectively indicated by reference number 225. The telephony application 220 supports telephony services to establish voice calls over a mobile network and may comprise without limitation a telephone application such as a cellular telephone application, a voice over internet protocol (VoIP) application, a push-to-talk (PTT) application, and so forth.

The SMS application 250 supports the short message service, which permits the sending of short messages (also known as text messages) between mobile phones and other devices. Instead of, or in addition to, an SMS application, other messaging applications may be employed which are arranged to communicate various types of messages in a variety of formats. The messaging applications may be representative of a particular kind of transport, enabling handling of messages of particular types and formats for the particular application. It is to be understood that the embodiments are not limited in this regard and that both the telephony application and SMS application may include any other type of communications or messaging applications which is consistent with the described embodiments.

Supporting the applications 205, 220, and 225 in the architecture 200 are an operating system 230 and a hardware layer 235. In this exemplary embodiment, the operating system 230 is particularly adapted to operate on a resource-limited device and may comprise, for example, Microsoft Windows® CE The hardware layer 235 provides an abstraction of the physical hardware implemented on the device to the operating system 230 and applications 205, 220, and 225 above it. For example, such physical hardware may typically include a processor (e.g., a central processor or "CPU"), system memory such as read only memory ("ROM") and random accessory memory ("RAM"), bus structures, peripheral systems, drives, display devices, user controls and interfaces, etc. The hardware may also include storage media for storing computer-executable instructions (i.e., code) including either or both removable media and nonremovable media such as magnetic and optical media, solid-state memory, and other conventional media. A user interface (UI) 240 is also provided by the architecture 200 to support user interactivity and facilitate an effective user experience, and will typically be embodied as a graphical user interface.

The architecture 200 in FIG. 3 shows several illustrative interfaces that are implemented among various functional components operating on the mobile device. In this example the remote access application 205 registers a call event listener 410 with the operating system 230 through an API 415 in order to monitor and/or control call and message activity on the mobile device. The remote access application 205 will also typically interact with the other messaging applications executing on the mobile phone by APIs that are respectively exposed by the other applications. For example, as shown in FIG. 3, a representative API 420 which is exposed by telephony application 220 enables the remote access application 205 to invoke various functions, pass parameters, and exchange data with the telephony application 220. Likewise, a representative API 425 which is exposed by SMS application 250 enables the remote access application 205 to invoke various functions, pass parameters, and exchange data with the SMS application 250.

For instance, in one particular implementation, when the call event listener 410 determines that a call or message is being received from third parties over the mobile communication network, the remote access application 205 cooperates with the SMS application, telephony application 220 or other application(s) as appropriate to forward the call or message to the client device over a WLAN under predetermined circumstances so that communication between the client device and the remote party is established through the mobile network via the mobile device using the WLAN It should be noted that the architecture shown in FIG. 3 represents only one example of an architecture that may be used to implement the functionality described herein and that many other architectures may be employed instead. For instance, in one implementation, the functionality of the remote process application, in whole or in part, may be directly embedded into the operating system 230.

Figure 4:
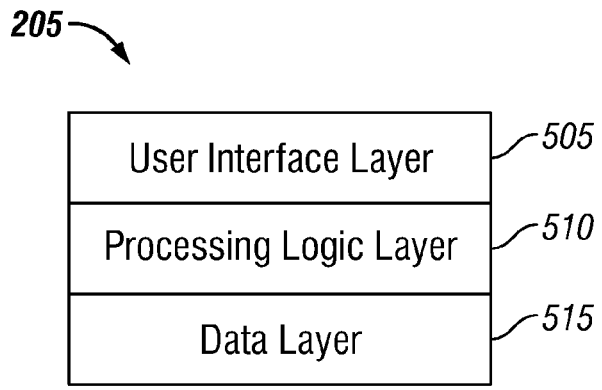
FIG. 4 shows an illustrative set of functional components which may comprise the remote access application.

FIG. 4 shows an illustrative set of functional components which may comprise the remote access application 205. The components include a user interface layer 505, processing logic layer 510, and data layer 515. It is particularly pointed out that the functional components shown in FIG. 4 are merely illustrative and that other components may also be used in various combinations depending on the needs of a given scenario and to provide the features and functionalities described herein. The functional components in the remote access application 205 are generally configured to support a variety of features, functionalities, and interfaces including supporting a user experience, interacting with other applications, applying logic and rules to implement the desired behavior of the application, and handling data. The functional components in the particular exemplary embodiment of FIG. 4 may be implemented, at least in part, by computer-executable code which is written to one or more storage media that are disposed on the mobile device 200 and which execute via one or more processors that are included in the device's hardware.

The remote access application 205 supports a user experience by accommodating user preferences when a call or message is received or sent. For instance, the user interface layer 505 may allow the user to establish various user preferences. For instance, the user interface layer 505 may allow the user to specify the circumstances under which a call or message should be forwarded to one or more client devices. Such circumstances may include only forwarding calls or messages which are received from predetermined parties who have been specified by the user. In this case the remote access application may interact with a contacts application residing on the mobile communication device so that, for instance, only calls or messages received from someone included in the contacts application will be forwarded on to the client device.

User interface layer 205 may also establish user preferences that involve the initiation of a call or message by the client device. For instance, user interface layer 205 may expose controls to the user on the client device which are based on the inherent features and functionality of the mobile communication device. These controls may the same or similar to the native user interface (including its graphical user interface and the like) available on the mobile communication device itself. Alternatively, these controls may be modified or otherwise adapted for use on the client device. In this way various features such as a larger display or full keyboard which are available to the user through the client device can be leveraged to provide an enhanced user experience over what is available through the native user interface of the mobile communication device.

The remote access application 205 will generally apply processing logic and rules to implement the desired behavior as indicated by reference number 510. Application of the processing logic and rules will typically implement a variety of routines, processes, and workflows in response to the receipt of an incoming call or message from the third party or the client device as monitored by the listener 410 to support the user experiences described above.

Various data handling functions are also supported by the remote access application 205 including receiving calls or messages and possibly associated information such as call or message metadata. For instance, if only calls or messages received under certain circumstances (e.g., only calls or messages received from specified parties) are to be forwarded to the client device, the data layer 515 may include a data handler for fetching metadata from an incoming call or message which pertains to the identity of the third party. In this way the processing logic layer may be instructed through the user experience layer 505 to only forward calls or messages for which the metadata indicates that the prescribed circumstances have been satisfied, such as when a match is found between metadata indicating the identity of the third party and the identity of a third party who has been specified by a user of the client device.

Figure 5:
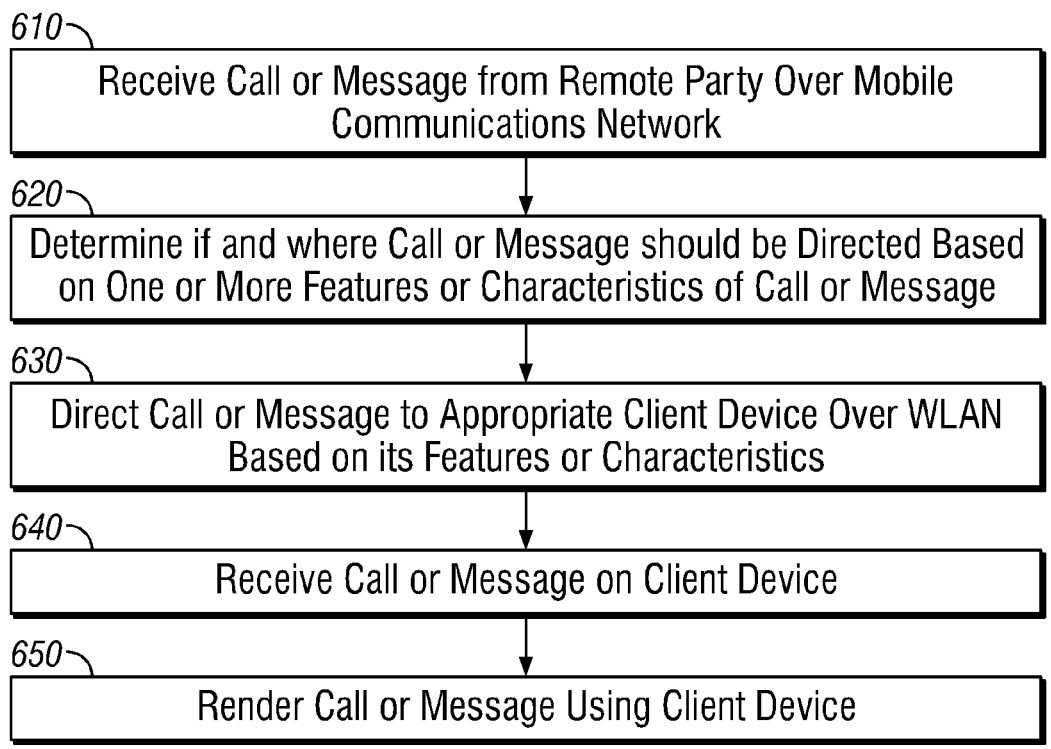
FIG. 5 is a flowchart showing one example of a method for managing an incoming call or message that is received by a mobile communication device.

FIG. 5 is a flowchart showing one example of a method for managing an incoming call or message that is received by a mobile communication device. The method begins in step 610 when a call or message is received from a remote party over a mobile communications network. In step 610 the mobile communication device determines if the call or message may be classified as a type of message that is to be directed to the client device over a WLAN. Calls or messages may be classified based on features or characteristics of the call or message which are chosen by the user. For example, a user may classify all calls or messages received from a particular party and/or all calls or messages received at a particular time as calls or messages that should be forwarded. Call or message classifications are selected in advance by the user either directly through the user interface of the mobile communication device or remotely using a client device. A call or message is of a predetermined type The user also specifies the client device or devices to which the calls or messages are to be directed. In some implementations different classes of messages may be directed to different client devices. For instance, by way of example, calls or messages received from family members of the user may be directed via the mobile device at any time of the night to a PC located in a den off the user's bedroom, whereas calls or messages received from friends may be directed during daytime hours to a PC which the user uses at work and during evening hours to a PC or other client device located in the user's living room. Accordingly, in optional step 620 the mobile communication device determines how the particular type of call or message being received is to be handled based on its classification, e.g., on the identity of the caller and/or the time at which the call or message is received.

Once the mobile device determines where the call is to be directed, in step 630 the call or message is directed to the appropriate client device(s) over a WLAN so that communication between the client device and the remote party is established over both the mobile network and the WLAN. That is, the mobile device does not simply transfer the call or the message. Rather, it remains in the communication path between the remote party and the user.

The client device receives the call or message over the WLAN in step 640. After the user takes the necessary action (e.g., answering the call or opening the message), the client device will render the communication (e.g., a call or message) in step 650 in an appropriate manner. For instance, if the communication involves audio, the audio will be rendered by a speaker associated with the client device. If on the other hand the communication involves text and/or images, the communication will be rendered on a display screen associated with the client device.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of using a mobile communications device, comprising:
   controlling operation of a mobile communication device over a WLAN;
   causing the mobile communication device to route a communication between a user and a remote party over the WLAN and a mobile communication network and through the mobile device based upon user-specified preferences entered into a remote access application that executes on the mobile communication device,
      wherein the user-specified preferences specify circumstances under which a received call or message should be forwarded to one or more client devices and how the mobile communication device is to respond when a call or message is sent; and
   maintaining or placing a display screen of the mobile communication device in an off state while the mobile communication device forwards the call or message, wherein the mobile communication device remains in use while the display screen is in the off state by remaining in a communication path between the remote party and the user.

2. The method of claim 1 in which controlling operation of the mobile communication device includes establishing communication between the mobile communication device and a client device over the WLAN and further comprising monitoring the operation of the mobile communication device over the WLAN.

3. The method of claim 1 further comprising using an interface associated with a client device to communicate over the WLAN with the remote party who is in communication with the mobile device over the mobile network.

4. The method of claim 1 further comprising rendering a communication from, or initiating a communication to, the remote party using a client device and not the mobile communication device.

5. The method of claim 4 in which rendering the communication includes rendering a phone call received from the remote party through a speaker associated with a client device.

6. The method of claim 4 in which rendering the communication includes rendering a text communication received from the remote party on a display screen associated with a client device.

7. The method of claim 4 in which rendering the communication includes sending an audio communication to the remote party through a microphone associated with a client device.

8. The method of claim 1 in which the WLAN operates in accordance with the IEEE 802.11 protocol.

9. The method of claim 3 further comprising using the interface associated with a client device to initiate a phone call to the remote party through the mobile device.

10. The method of claim 3 further comprising using the interface to expose controls to a user based on functionality available through a user interface of the mobile communication device.

11. A method for remote access to a mobile communication device over a wireless local area network WLAN, the method comprising:
   receiving a call or message from a remote party over a mobile network;

forwarding the call or message of a first predetermined type to a first client device over the WLAN so that communication between the first client device and the remote party is established over both the mobile network and the WLAN, wherein the mobile communication device remains in a communication path between the remote party and the first client device;

forwarding a call or message of a second predetermined type to a second client device over a WLAN, wherein the first client device is different than the second client device, wherein the first predetermined type or second predetermined type of call or message is received and forwarded by a mobile communication device; and maintaining or placing a display screen of the mobile communication device in an off state while forwarding the call or message, wherein the mobile device is used as part of the communication path between the remote party and the first client device while the display screen is in the off state, and, wherein a remote access application on the mobile communication device is arranged to determine how the mobile communication device is to respond when a call or message is received or sent.

12. The method of claim 11 in which the first predetermined type or second predetermined type includes calls or messages received from specified parties.

13. The method of claim 11 in which the first predetermined type or second predetermined type includes calls or messages received during specified times of day.

14. The method of claim 11 in which at least one of the first client device or second client device is a personal computer.

15. A mobile communication device, comprising:

one or more wireless transmitters and receivers for communicating with remote parties over a mobile communication network and with a client device over a wireless local area network WLAN;

one or more processors for executing machine-executable instructions; and one or more machine-readable storage media for storing the machine-executable instructions, the instructions when executed by the one more processors implementing, a remote access application on the mobile communication device arranged to determine how the mobile communication device is to respond when a call or message is received or sent;

a call event listener arranged for listening for calls or messages received from remote parties over the mobile communication network;

processing logic configured, in response to a determination by the call event listener that a call or message has been received from a remote party, to forward the call or message to the client device over the WLAN under predetermined circumstances so that communication between the client device and the remote party is established over both the mobile network and the WLAN; and a display screen configured to be maintained or placed in an off state while forwarding the call or message, wherein the mobile device remains in use while the display screen is in the off state.

16. The mobile communication device of claim 15 further comprising a data handler for fetching metadata from the call or message pertaining to an identity of the third party from the received call or message, said processing logic being further configured to forward calls or messages for which the metadata indicates that the predetermined circumstances have been satisfied.

17. The mobile communication device of claim 15 in which the predetermined circumstances includes a match between metadata indicating an identity of the third party and a third party included on a list of third parties previously specified through the client device.

* * * * *